(12) United States Patent
Rapaport et al.

(10) Patent No.: US 8,709,332 B2
(45) Date of Patent: Apr. 29, 2014

(54) THERMOFORMING SHEET LOADING APPARATUS AND METHOD

(75) Inventors: Zvi Rapaport, Portland, OR (US); Chad E. Howard, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 210 days.

(21) Appl. No.: 13/187,116

(22) Filed: Jul. 20, 2011

(65) Prior Publication Data
US 2013/0020743 A1 Jan. 24, 2013

(51) Int. Cl.
*B29C 49/00* (2006.01)

(52) U.S. Cl.
USPC .............................. 264/511; 264/523; 264/571

(58) Field of Classification Search
None
See application file for complete search history.

(56) References Cited

U.S. PATENT DOCUMENTS

| | | |
|---|---|---|
| 2,645,479 A | 7/1953 | Mitchell |
| 4,267,142 A | 5/1981 | Lankheet |
| 5,848,785 A | 12/1998 | Hardwick et al. |
| 6,095,514 A | 8/2000 | Kudo et al. |
| 6,349,930 B1 | 2/2002 | Kruger et al. |
| 6,440,353 B1 | 8/2002 | Hutchins |
| 6,659,758 B2 | 12/2003 | Ekendahl et al. |
| 6,705,853 B1 | 3/2004 | Nehring |
| 6,969,246 B1 | 11/2005 | Kundinger et al. |
| 7,045,086 B2 | 5/2006 | Fitzell, Jr. |
| 7,665,982 B2 | 2/2010 | Lucier et al. |
| 7,972,129 B2 | 7/2011 | O'Donoghue |

FOREIGN PATENT DOCUMENTS

WO  WO 01/94207  12/2001

OTHER PUBLICATIONS

International Search Report and Written Opinion dated Sep. 21, 2012, International Filing Date Jul. 18, 2012, International Application No. PCT/US12/47156.

*Primary Examiner* — Monica Huson
(74) *Attorney, Agent, or Firm* — Plumsea Law Group, LLC (57) ABSTRACT

A method of manufacturing an article includes simultaneously holding, with a vacuum device, a first object and a second object that are overlapped and abutted against each other. The method also includes simultaneously transporting the first and second objects relative to a machine. Still further, the method includes attaching the first and second objects together with the machine.

23 Claims, 5 Drawing Sheets

THERMOFORMING SHEET LOADING APPARATUS AND METHOD

FIELD

The present disclosure relates to thermoforming and, more particularly, to a thermoforming sheet loading apparatus and method.

BACKGROUND

Thermoforming is a manufacturing process in which an object, such as a polymeric sheet or film, is heated until pliable, formed into a shape with a mold, and then cooled. Twin sheet thermoforming is a related process in which two objects are heated, formed by respective molds, bonded together while still hot, and then cooled to form, typically, a hollow article. With these processes, articles can be formed in a wide variety of shapes, and the articles can be produced efficiently using a variety of materials.

In the case of twin sheet thermoforming, the sheets are often loaded independently into the thermoforming oven, which can disadvantageously increase manufacturing time. Also, in some cases, the sheets are each connected to opposite sides of a spacer, and the assembly is loaded into the oven. In this latter case, attaching the sheets to the spacer can take a significant amount of time, and/or the formed part typically needs to be cut from the spacer, each of which reduces manufacturing efficiency. Moreover, in some cases, a frame, insert, or other object is sometimes introduced between the molds to properly form the article, and positioning these parts between the molds can be additionally time consuming and can negatively impact manufacturing efficiency.

SUMMARY

Accordingly, despite the improvements of known devices described above, there remains a need for a method of manufacturing an article that includes simultaneously holding, with a vacuum device, a first object and a second object that are overlapped and abutted against each other. The method also includes simultaneously transporting the first and second objects relative to a machine. Still further, the method includes attaching the first and second objects together with the machine.

A thermoforming system is also disclosed that includes a vacuum device operable to simultaneously hold a first object and a second object that are overlapped and abutted against each other. The system also includes a thermoforming machine that heats the first and second objects, that attaches the first and second objects together, and that forms the first and second objects into a thermoformed article.

Moreover, a method of manufacturing a thermoformed bladder is disclosed that includes providing a vacuum device with a suction head, a handling device with a first vacuum rack and a second vacuum rack, and a thermoforming machine with a heating device and a mold. The method also includes providing a first sheet, a second sheet, and an insert in a stack on a support surface, wherein the first and second sheets are made of a polymer, wherein the first and second sheets are abuttingly layered over each other in the stack, and wherein the first and second sheets are stacked over the insert in the stack. The method further includes seizing the first and second sheets from the stack simultaneously with the vacuum device by contacting only one of the first and second sheets with the suction head and suspending the other of the first and second sheets from the one of the first and second sheets. Furthermore, the method includes transporting the first and second sheets simultaneously from the support surface to the handling device. Additionally, the method includes coupling the first sheet to the first vacuum rack via suction and coupling the second sheet to the second vacuum rack via suction. Moreover, the method includes moving the first sheet and the first vacuum rack away from the second sheet and the second vacuum rack. Also, the method includes seizing the insert with the vacuum device and placing the insert between the first and second sheets with the vacuum device and heating the first and second sheets with the heating device. Furthermore, the method includes attaching a first portion of the insert to the first sheet, attaching a second portion of the insert to the second sheet, and extending a connecting member of the insert that is connected to both of the first and second portions of the insert. Still further, the method includes attaching the first and second sheets together and forming the first and second sheets to include three dimensionally curved surfaces of the bladder using the mold.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring to FIGS. 1-10, a system 10 for attaching a first object 12 and a second object 14 together is schematically illustrated. The system 10 can be a thermoforming system 10 and can be used for twin sheet thermoforming processes in some embodiments; however, it will be appreciated that the teachings of the present disclosure can be applied to other types of systems and manufacturing methods without departing from the scope of the present disclosure.

Figure 8:
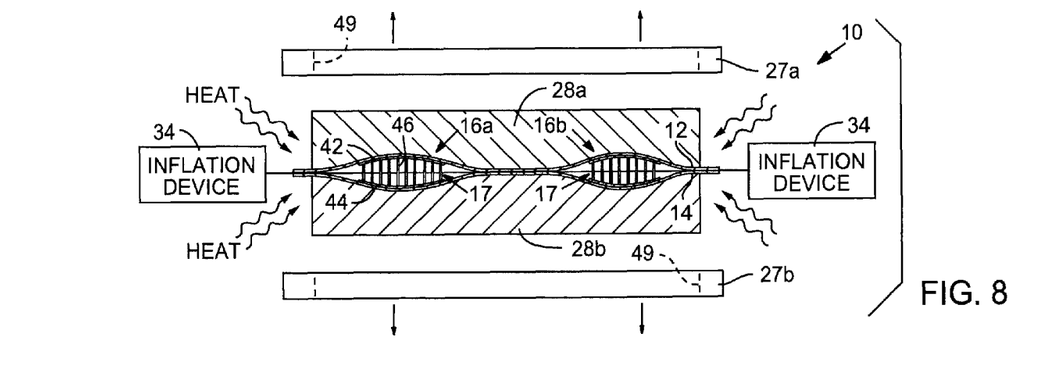
FIG. 8 is a schematic view the thermoforming system of FIG. 1.
Figure 9:
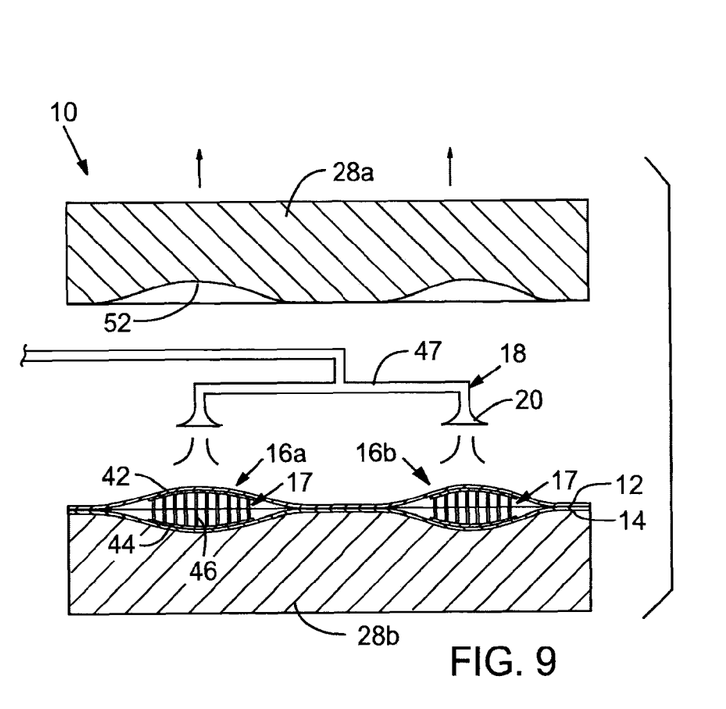
FIG. 9 is a schematic view the thermoforming system of FIG. 1.
Figure 10:
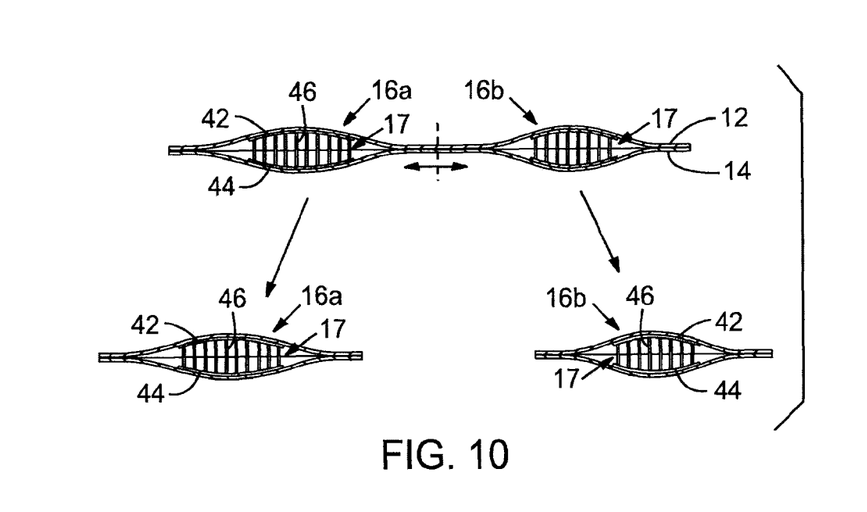
FIG. 10 is a schematic view the system of FIG. 1.

In the case of a thermoforming system 10, the first and second objects 12, 14 can be heated, formed, and attached to form an article, such as a bladder 16a, 16b (FIGS. 8-10). More specifically, as will be discussed, the system 10 can manipulate and transport the first and second objects 12, 14, place an insert 17 between the objects 12, 14, and substantially seal the objects 12, 14 together to form a plurality of bladders 16a, 16b in a very efficient manner. The bladders 16a, 16b can be included in an article of footwear, in shin guards or other sports equipment, or in any other suitable item (not shown). However, it will be appreciated that the system 10 can be used for manufacturing any suitable article other than a bladder 16a, 16b without departing from the scope of the present disclosure.

Figure 4:
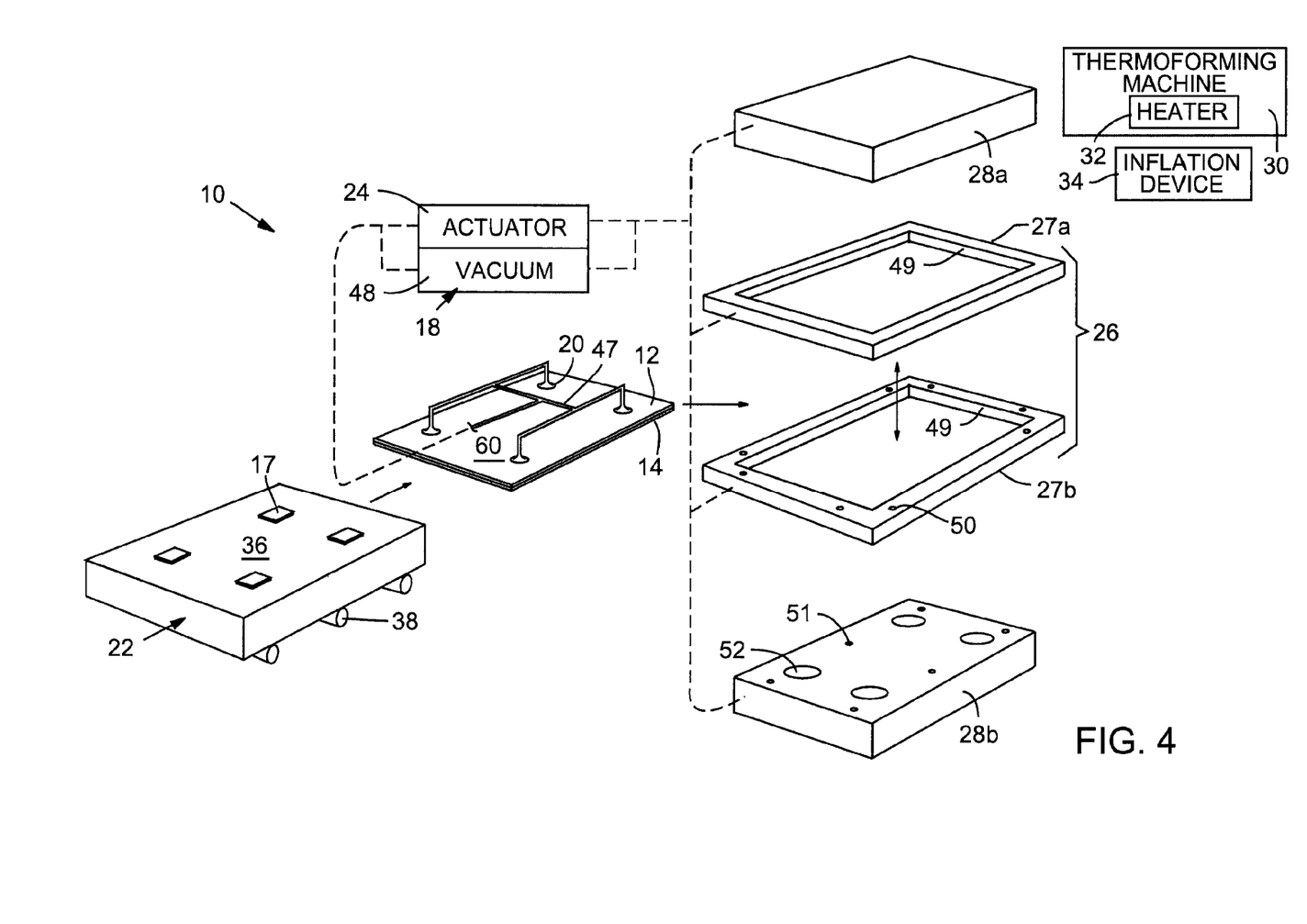
FIG. 4 is a schematic view the thermoforming system of FIG. 1.

As schematically illustrated in FIG. 4, the system 10 can include a vacuum device 18 with one or more suction members 20 (i.e., suction heads). The system 10 can also include a loading member 22, an actuator 24, and a handling device 26 with one or more vacuum racks 27a, 27b (i.e., suction members). Furthermore, the system 10 can include a thermoforming machine 30 with a heating device 32, molds 28a, 28b, and an inflation device 34.

Figure 1:
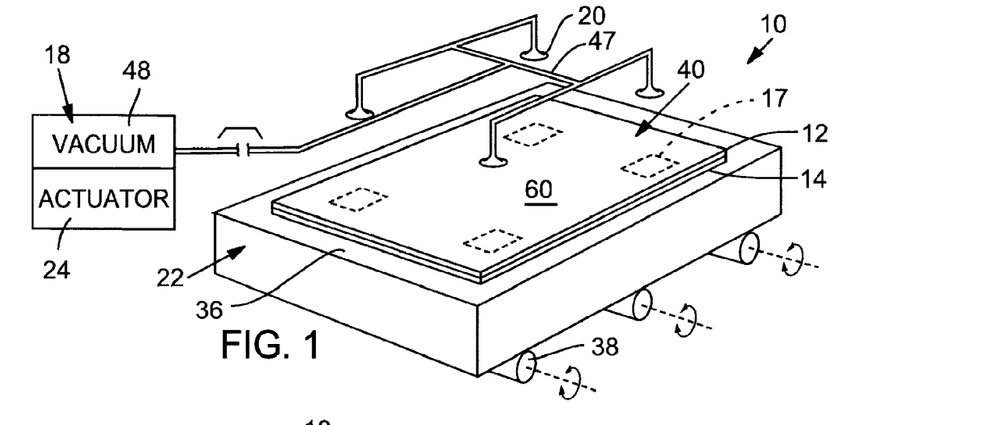
FIG. 1 is a schematic view of a portion of a thermoforming system for thermoforming an article.
Figure 2:
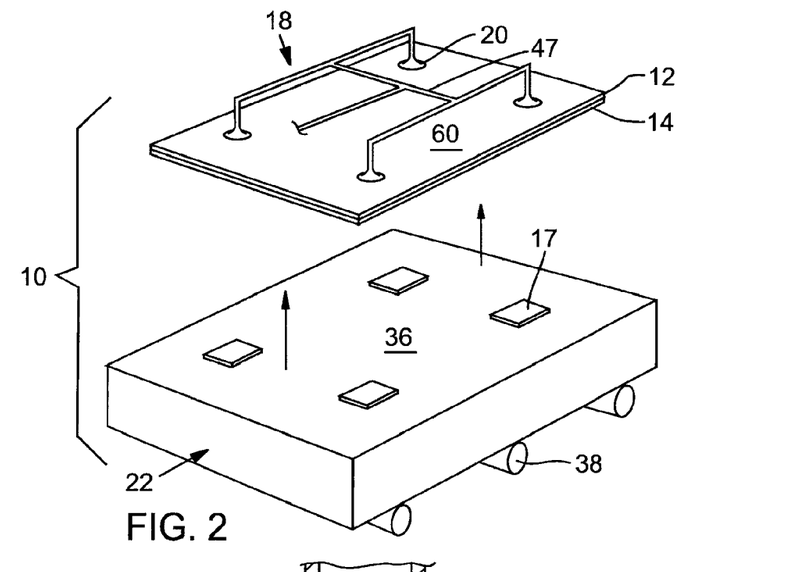
FIG. 2 is a schematic view the thermoforming system of FIG. 1.
Figure 3:
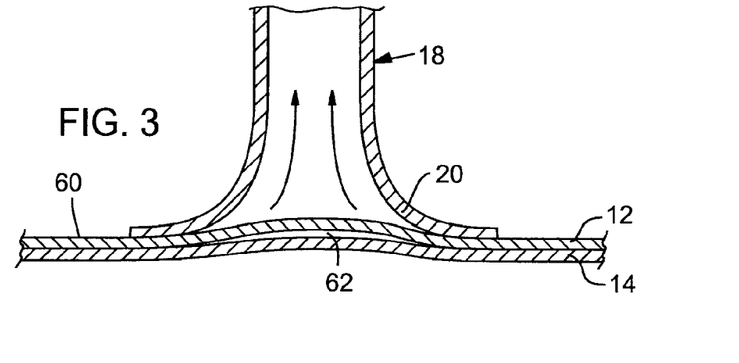
FIG. 3 is a schematic view the thermoforming system of FIG. 1.
Figure 5:
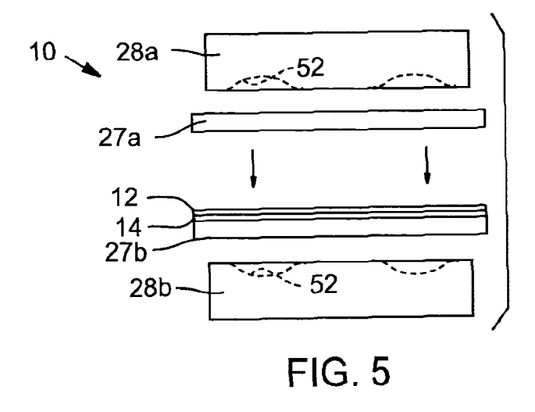
FIG. 5 is a schematic view the thermoforming system of FIG. 1.
Figure 6:
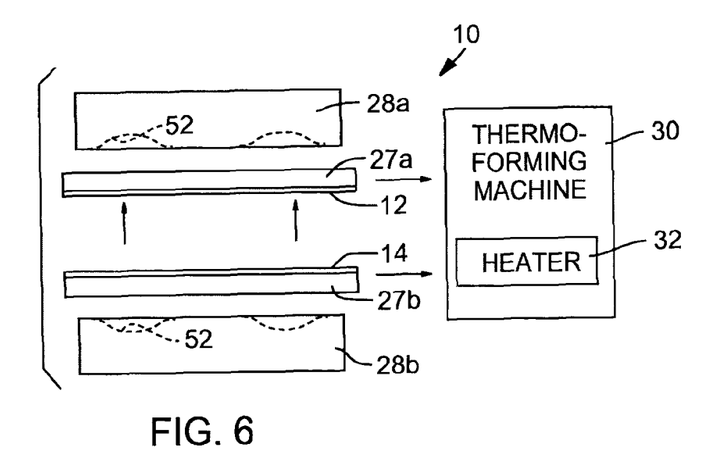
FIG. 6 is a schematic view the thermoforming system of FIG. 1.
Figure 7:
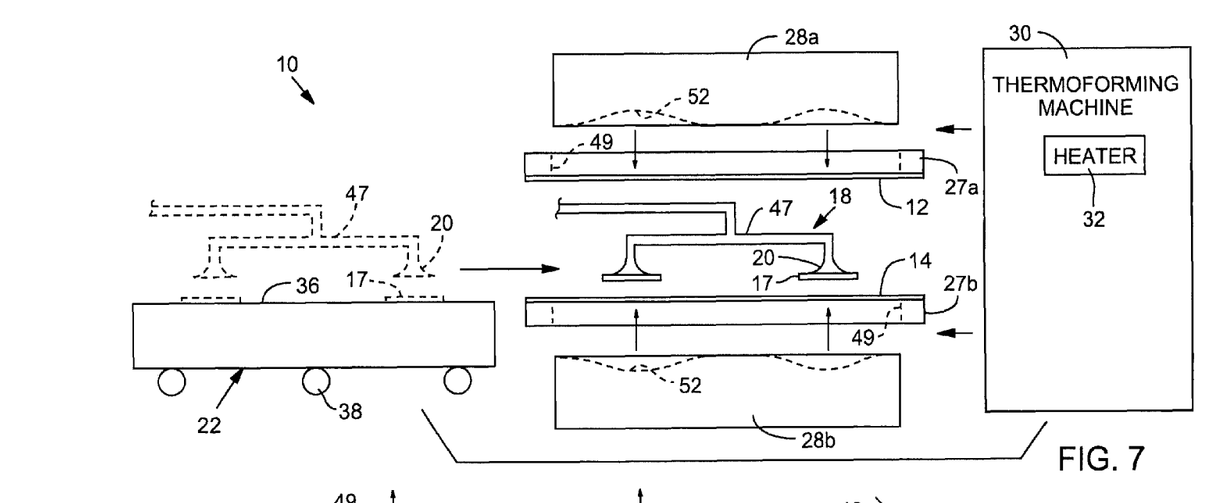
FIG. 7 is a schematic view the thermoforming system of FIG. 1.

Generally, the objects 12, 14 and the inserts 17 can be layered and stacked on the loading member 22 as shown in FIG. 1. Then, as shown in FIGS. 2 and 3, the suction members 20 of the vacuum device 18 can seize (hold, retain, etc.) the first and second objects 12, 14 simultaneously and lift or otherwise transport the first and second objects 12, 14 away from the loading member 22. Next, as shown in FIG. 4, the actuator 24 can cause the suction members 20 of the vacuum device 18 to transport the first and second objects 12, 14 simultaneously to the handling device 26, whereupon the objects 12, 14 are subsequently surrendered to the handling device 26 (FIG. 5). Then, as shown in FIGS. 5 and 6, the vacuum racks 27a, 27b can couple to the first and second objects 12, 14, respectively, and separate the first and second objects 12, 14. Next, the objects 12, 14 can be heated by the heating device 32 until pliable. Subsequently, as shown in FIG. 7, the inserts 17 can be placed between the first and second objects 12, 14. Then, as shown in FIG. 8, the molds 28a, 28b can be used to form and attach the objects 12, 14 together while heat is applied and while the inflation device 34 inflates the area between the objects 12, 14. Next, as shown in FIG. 9, the molds 28a, 28b can be separated and the vacuum device 18 can remove the bladders 16a, 16b therefrom. Then, the individual bladders 16a, 16b can be separated from each other, and the bladders 16a, 16b can be individually trimmed to remove excess material as shown in FIG. 10.

As will be discussed, the system 10 and its method of operation can manufacture the bladders 16a, 16b in a very efficient manner. For instance, because the first and second objects 12, 14 are seized, held, and transported simultaneously by the vacuum device 18, the manufacturing process can be completed relatively quickly, without the need for redundant handling equipment, and with relatively little preparation of the objects 12, 14. Also, one or more operations can be partially or completely automated, for instance, using one or more robots. As such, the bladders 16a, 16b can be made relatively quickly, and the bladders 16a, 16b can be formed within high tolerances in a repeatable fashion.

Various features of the system 10 will now be discussed in greater detail. As shown in FIGS. 1, 2 and 4, the loading member 22 can be a sturdy platform with a substantially flat support surface 36. The loading member 22 can also be mobile. For instance, the loading member 22 can include one or more wheels 38 for moveably supporting the loading member 22. In some embodiments, the loading member 22 can be manually moved, but in other embodiments, the loading member 22 can be motorized or otherwise automatically moved.

As shown in FIG. 1, the first and second objects 12, 14 and inserts 17 can be arranged in a stack 40 on the support surface 36. For instance, the first object 12 can be overlapped and layered directly over the second object 14 such that the first and second objects 12, 14 are aligned and are directly abutting each other (i.e., abuttingly layered). Also, the second object 14 can be overlapped and layered directly over the inserts 17. Also, the stack 40 can be arranged according to the number and position of the suction members 20 of the vacuum device 18. For instance, the first and second objects 12, 14 can be positioned on the surface 36 such that the weight of the objects 12, 14 can be distributed substantially evenly between the suction members 20. Also, each of the inserts 17 can be spaced apart according to the spacing of the suction members 20 so that each suction member 20 is able to seize one of the inserts 17 as will be discussed.

Moreover, although the stack 40 illustrated in FIG. 1 includes only the first object 12, the second object 14, and the inserts 17 in respective layers, it will be appreciated that the stack 40 could include a series of first and second objects 12, 14 and inserts 17. For instance, the stack 40 could include the first object 12, which is layered over the second object 14, which is layered over the inserts 17, which are layered over another first object 12, which is layered over another second object 14, which is layered over additional inserts 17, and so on. Also, the stack 40 can be arranged manually or automatically by an automated feeder, conveyer, etc.

The objects 12, 14, can be of any suitable type, such as substantially flat sheets of polymeric material. For instance, the objects 12, 14 can be made of urethane material with a microlayer construction. In some embodiments, the objects 12, 14 can be made of or include one or more materials discussed in U.S. Pat. No. 5,952,065, U.S. Pat. No. 5,713,141, U.S. patent application Ser. No. 08/580,946, U.S. Pat. No. 6,521,305, U.S. Pat. No. 6,620,472, U.S. patent application Ser. No. 08/475,276, U.S. Pat. No. 6,599,597, U.S. Pat. No. 6,730,379, U.S. Pat. No. 7,851,036, U.S. patent application Ser. No. 08/475,275, U.S. Pat. No. 6,203,868, U.S. Pat. No. 6,321,465, U.S. Pat. No. 6,013,340, U.S. Pat. No. 6,391,405, U.S. Pat. No. 6,797,215, U.S. Pat. No. 6,652,940, U.S. Pat. No. 6,692,803, U.S. Pat. No. 7,078,091, U.S. Pat. No. 6,127,026, U.S. Pat. No. 6,082,025, U.S. Pat. No. 6,846,534, and/or U.S. Pat. No. 6,582,786, each of which is hereby incorporated by reference in its entirety.

The inserts 17 can be made out of any suitable material. For instance, as shown in FIGS. 8-10, the inserts 17 can include a first sheet portion 42, a second sheet portion 44, and a plurality of connecting members 46. The inserts 17 can include materials disclosed in U.S. Pat. No. 6,119,371, which issued Sep. 19, 2000, and which is hereby incorporated by reference in its entirety.

Additionally, the vacuum device 18 can include any number of suction members 20. The suction members 20 can each be coupled to a support frame 47. The support frame 47 can be a rigid member with fluid passageways extending therethrough, and the suction members 20 can be suspended from respective ends of the support frame 47. The support frame 47 can also be in fluid communication with a vacuum source 48. As such, the suction members 20 can be at a fixed distance away from each other at respective ends of the frame 47, and the suction members 20 can be in communication with the vacuum source 48 via the passageways extending through the frame 47.

The vacuum device 18 and the vacuum source 48 can also be operably coupled to the vacuum racks 27a, 27b of the handling device 26 as shown in FIG. 4. Moreover, the vacuum device 18 and the vacuum source 48 can be operably coupled to the molds 28a, 28b as shown in FIG. 4. In other embodiments, the system 10 can include separate, independent vacuum sources 48 for providing suction to the suction members 20, the vacuum racks 27a, 27b, and the molds 28a, 28b.

The vacuum racks 27a, 27b can be rectangular, frame-shaped members, each with a respective opening 49. The vacuum racks 27a, 27b can also include one or more ports 50 (FIG. 4). In the embodiments illustrated, the vacuum racks 27a, 27b each include a respective elongate, groove-shaped port 50. The ports 50 can be in communication with the vacuum source 48. Thus, as will be discussed, the vacuum rack 27a can provide suction to the first object 12 to thereby retain the first object 12, and the vacuum rack 27b can provide suction to the second object 14 to thereby retain the second object 14.

The actuator 24 can be of any suitable type, such as an electrically powered, programmable robot. The actuator 24 can also include one or more pneumatically-powered actuators, one or more hydraulically-powered actuators, or any other suitable type of actuator 24. The actuator 24 can be operably coupled to the frame 47, to the vacuum racks 27a, 27b, to the molds 28a, 28b, or any other component of the system 10 for actuating the same. It will be appreciated that there can be a common actuator 24 for actuating different components, or there can be a plurality of independent actuators 24 for actuating single components. The actuator 24 can move linearly and/or rotationally in any suitable direction.

Moreover, the actuator 24 can provide relative movement between, for instance, the frame 47 and the thermoforming machine 30. As such, the actuator 24 can move the frame 47 while the machine 30 remains stationary, or vice versa, or the actuator 24 can move both the frame 47 and the machine 30 simultaneously relative to each other. The actuator 24 can provide similar relative movement between any of the components of the system 10 as well.

Additionally, as shown in FIGS. 4-6, the molds 28a, 28b can be substantially solid members with one or more female cavities 52 therein. The cavities 52 can be three-dimensionally curved according to the desired shape of the bladder 16a, 16b. The molds 28a, 28b can be operably coupled to the actuator 24 to move toward and away from each other. The molds 28a, 28b can also include one or more ports 51 (FIG. 4), which are in communication with the vacuum source 48 such that the molds 28a, 28b can provide suction to the first and second objects 12, 14 as will be discussed below.

As shown in FIG. 8, the molds 28a, 28b can move toward each other to form the bladders 16a, 16b within the cavities 52. Then, as shown in FIG. 9, the molds 28a, 28b can move apart to reveal the formed bladders 16a, 16b. In some embodiments, the width of the molds 28a, 28b can be less than the inner width of the openings 49 of the vacuum racks 27a, 27b (FIG. 4). As such, the molds 28a, 28b can be received in and move through the openings 49 for purposes that will be discussed. It will be appreciated that the molds 28a, 28b can include a single cavity 52 for forming a single bladder 16a, 16b, or as shown in FIGS. 4-9, the molds 28a, 28b can include multiple cavities 52 for forming a plurality of bladders 16a, 16b simultaneously.

Still further, the thermoforming machine 30 can include the heating device 32. The heating device 32 can be a electrical resistance-type heating device 32 or any other suitable type. Also, the thermoforming machine 30 can include a chamber (not specifically shown) that receives the vacuum racks 27a, 27b and/or the molds 28a, 28b.

The method of manufacturing of the bladders 16a, 16b will now be discussed in greater detail. It will be appreciated that the sequence of manufacturing can be varied in any suitable manner without departing from the scope of the present disclosure.

Beginning in FIG. 1, the stack 40 can be provided on the support surface 36. Then, the actuator 24 can actuate the frame 47 and the connected suction members 20 toward the support surface 36 until the suction members 20 directly contact and abut a top surface 60 of the first object 12. As shown in FIG. 3, the suction members 20 can provide suction to the top surface 60, and the suction members 20 can be lifted away from the support surface 36 such that the first object 12 is lifted from the support surface 36. Also, as a result, the second object 14 can be suspended from the first object 12 and lifted from the support surface 36 such that the first and second objects 12, 14 are seized, held, and lifted simultaneously by the suction members 20.

It will be appreciated that both the first and second objects 12, 14 can be held even though the suction members 20 directly contact only the first object 12. The second object 14 can be held to the first object 12 via static electricity. Also, as shown in FIG. 3, one or more substantially sealed cavities (microcavities) 62 can be defined between the first and second objects 12, 14, and as the first object 12 deforms due to the suction provided by the suction members 20, the cavity 62 can increase in volume to thereby reduce pressure in the cavity 62 and to thereby hold the second object 14 to the first object 12. A combination of these effects can also be employed for holding the second object 14 to the first object 12. Furthermore, in some embodiments, the static electricity between the first and second objects 12, 14 can be intentionally increased, for instance by applying ionized air, by wiping the first and/or second objects 12, 14 or in any other way.

In additional embodiments, the first object 12 can be porous such that suction can be provided to the second object 14 through the pores of the first object 12 and such that the first and second objects 12, 14 can be simultaneously held. It will also be appreciated that the suction members 20 or other suction devices can simultaneously seize, hold, retain, and transport the first and second objects 12, 14 in any suitable fashion other than those illustrated and described herein.

Once the first and second objects 12, 14 have been retained, the actuator 24 can actuate the frame 47 toward the vacuum racks 27a, 27b of the handling device 26 as shown in FIG. 4. For instance, the vacuum racks 27a, 27b can be disposed adjacent, but outside the thermoforming machine (FIG. 5), and the frame 47 can move between the vacuum racks 27a, 27b and deposit both objects 12, 14 on the vacuum rack 27b by reducing or eliminating suction from the suction members 20. Then, the frame 47 can move out from between the vacuum racks 27a, 27b.

Next, as shown in FIGS. 5 and 6, the vacuum rack 27a can move toward the objects 12, 14 and the vacuum rack 27b. Once the vacuum rack 27a contacts the first object 12 and provides suction thereto, the vacuum rack 27a can move away from the vacuum rack 27b to thereby separate the first and second objects 12, 14. At this point, the first object 12 can be held on the vacuum rack 27a via suction, and the second object 14 can be held on the vacuum rack 27b via suction.

Subsequently, as shown in FIG. 6, the vacuum racks 27a, 27b and attached objects 12, 14 can be moved toward the heating device 32 of the thermal forming machine 30 and heated. The first and second objects 12, 14 can be heated for any suitable amount of time (e.g., between approximately 30 seconds and 3 minutes) at any suitable temperature until pliable. In some embodiments, the first and second objects 12, 14 can be heated until both begin to droop slightly within or away from the respective openings 49 (FIG. 4) of the vacuum racks 27a, 27b.

While the objects 12, 14 are being heated, the suction members 20 can actuate back toward the loading member 22 to seize and lift the inserts 17 from the support surface 36. Then, the suction members 20 and inserts 17 can be moved toward the thermoforming machine 30.

Once the first and second objects 12, 14 have been sufficiently heated, the vacuum racks 27a, 27b can be removed from the thermoforming machine 30, and the inserts 17 can be deposited between the first and second objects 12, 14 using the vacuum device 18 as shown in FIG. 7. The inserts 17 can be located on the second object 14 such that each insert 17 is subsequently received in a respective cavity 52 of the molds 28a, 28b. In some embodiments, the mold 28b is actuated upwards and partially received within the opening 49 in the vacuum rack 27b to support the central portion of the second object 14 while the inserts 17 are placed thereon.

Next, as shown in FIG. 8, the vacuum device 18 can be removed from the molds 28a, 28b, and the molds 28a, 28b can be moved together. In some embodiments, the molds 28a, 28b can be received within the openings 49 of the vacuum racks 27a, 27b. Subsequently, as shown in FIG. 9, the vacuum racks 27a, 27b, the molds 28a, 28b, and the objects 12, 14 can be transported to the thermoforming machine 30, and heat can be further applied. The molds 28a, 28b can also apply pressure to the objects 12, 14 to thereby attach, affix, and fuse abutting surfaces of the objects 12, 14. Meanwhile, the first portion 42 of the insert 17 can attach to the first object 12 while the second portion 44 of the object can attach to the second object 14. Also, since the objects 12, 14 remain inside the respective cavities 52 of the molds 28a, 28b, the connecting members 46 can extend in length and remain attached to the first and second portions 42, 44.

In some embodiments, the suction provided by the molds 28a, 28b is sufficient to hold the objects 12, 14 within the respective cavities 52 of the molds 28a, 28b. Also, in some embodiments, the inflation device 34 can also provide pressurized gas into (i.e., inflate) the sealed space between the objects 12, 14 as shown in FIG. 8 to thereby form the objects 12, 14 according to the three-dimensionally curved interior surfaces of the cavities 52. In still additional embodiments, instead of the molds 28a, 28b providing suction and instead of inflating the space between the objects 12, 14 with the inflation devices 34, gravity or other forces cause the objects 12, 14 to move within the respective cavities 52 of the molds 28a, 28b to be formed therein.

Next, as shown in FIG. 9, the formed bladders 16a, 16b can be cooled, and the molds 28a, 28b and vacuum racks 27a, 27b can be moved away from each other. Then, the suction members 20 can be moved between the molds 28a, 28b in order to seize and remove the bladders 16a, 16b from the molds 28a, 28b. Subsequently, as shown in FIG. 10, the attached bladders 16a, 16b can be cut or otherwise separated from each other, and excess material (e.g., peripheral edges) can be trimmed, cut, or otherwise removed from each bladder as indicated by broken lines in FIG. 10. These cutting/separating processes can be completed automatically or manually.

Furthermore, although not illustrated, the bladders 16a, 16b can be each formed to include a port, a valve, or other feature, which can be used to further inflate the bladders 16a, 16b. Thus, manufacture of the bladders 16a, 16b can include further inflation of the bladders 16a, 16b up to a predetermined pressure. Then, the bladders 16a, 16b can be subsequently processed and assembled into an article of footwear, sports equipment, a backpack, or any other item.

Accordingly, the system 10 and its method of use described above can provide a highly efficient way of manufacturing bladders 16a, 16b or a number of other articles. For instance, the objects 12, 14 can be layered over each other on the support surface 36 quickly and easily and then automatically lifted therefrom simultaneously for further processing. This can significantly reduce preparation time and effort as compared to related prior art methods. Also, the objects 12, 14 can be subsequently handled, molded, and attached simultaneously in an automated fashion. Thus, the bladders 16a, 16b can be manufactured relatively quickly and within high tolerances.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of manufacturing an article with a machine comprising:
   providing a first object and a second object in a first location wherein the first object and the second object are overlapping and abutting against each other;
   applying suction with a vacuum device to the first object at the first location to cause the first object to be secured to the vacuum device;
   simultaneously transporting the first object, which is secured to the vacuum device, and the second object, which is secured to the first object, away from the first location toward the machine;
   placing the first object and the second object in the machine after simultaneously transporting the first object and the second object from the first location toward the machine; and
   attaching the first and second objects together with the machine to form the article after placing the first object and the second object in the machine.

2. The method of claim 1, wherein the vacuum device includes a suction member, wherein applying suction with the vacuum device includes applying suction with the suction member to the first object to secure the first object to the suction member, and wherein transporting the first object and the second object includes lifting the suction member away from the first location with the first object secured to the suction member causing the second object to be suspended from the first object.

3. The method of claim 1, wherein transporting the first object and the second object includes lifting the suction member away from the first location with the first object secured to the second object via static electricity between the first and second objects.

4. The method of claim 1, wherein transporting the first object and the second object includes lifting the suction member away from the first location with the first object secured to the suction member, which increases a volume of a substantially sealed cavity between the first and second objects, and which causes the second object to move away from the first location with the first object and the suction member.

5. The method of claim 2, wherein transporting the first object and the second object includes lifting the suction member in a first direction away from the first location with the first object secured to the suction member and the second object suspended from the first object in a second direction, the second direction being opposite the first direction.

6. The method of claim 1, wherein the first and second objects are each substantially flat sheets of a polymeric material.

7. The method of claim 1, further comprising providing an insert between the first and second objects before attaching the first and second objects together.

8. The method of claim 7, further comprising attaching the insert to both the first and second objects.

9. The method of claim 8, wherein attaching the insert to both the first and second objects includes attaching a first portion of the insert to the first object and attaching a second portion of the insert to the second object, and further comprising extending a connecting member of the insert that is connected to both of the first and second portions.

10. The method of claim 7, wherein providing the first object and the second object includes providing the first object, the second object, and the insert in a stack on a support surface at the first location, wherein the second object is disposed between the first object and the insert within the stack.

11. The method of claim 10, further comprising seizing the first and second objects simultaneously from the stack with the vacuum device, further comprising seizing the insert from the first location using the vacuum device after placing the first object and the second object in the machine, and transporting the insert into the machine and between the first and second objects using the vacuum device.

12. The method of claim 1, further comprising inflating a substantially sealed area between the first and second objects after attaching the first and second objects together.

13. The method of claim 1, wherein placing the first object and the second object in the machine includes placing the first object and the second object in a handling device of the machine, and further comprising separating the first and second objects with the handling device before attaching the first and second objects together.

14. The method of claim 13, wherein the handling device includes a first suction member and a second suction member, the first object coupling to the first suction member via suction, and the second object coupling to the second suction member via suction.

15. The method of claim 1, wherein the machine is a thermoforming machine and further comprising molding at least one of the first and second objects with a mold of the thermoforming machine.

16. A method of manufacturing a thermoformed bladder comprising:
providing a vacuum device with a suction head, a handling device with a first vacuum rack and a second vacuum rack, and a thermoforming machine with a heating device and a mold;
providing a first sheet, a second sheet, and an insert in a stack on a support surface, the first and second sheets made of a polymer, wherein the first and second sheets are abuttingly layered over each other in the stack, and wherein the first and second sheets are stacked over the insert in the stack;
applying suction with the suction head of the vacuum device to the first sheet in the stack to cause the first sheet to be secured to the suction head;
simultaneously transporting the first sheet, which is secured to the suction head, and the second sheet, which is secured to the first sheet, away from the support surface and toward the handling device;
placing the first sheet and the second sheet in the handling device after simultaneously transporting the first sheet and the second sheet;
coupling the first sheet to the first vacuum rack via suction and coupling the second sheet to the second vacuum rack via suction;
moving the first sheet and first vacuum rack away from the second sheet and the second vacuum rack;
seizing the insert with the vacuum device;
placing the insert between the first and second sheets with the vacuum device after moving the first sheet and the first vacuum rack away from the second sheet and the second vacuum rack;
heating the first and second sheets with the heating device;
attaching a first portion of the insert to the first sheet, attaching a second portion of the insert to the second sheet, and extending a connecting member of the insert that is connected to both of the first and second portions of the insert; and
fusing the first and second sheets together and molding at least one of the first and second sheets to form a three dimensionally curved surface using the mold.

17. A method of manufacturing an article with a machine comprising:
providing a first object and a second object in a first location wherein the first object and the second object are overlapping and abutting against each other;
applying suction with a suction member to the first object to secure the first object to the suction member;
lifting the suction member away from the first location with the first object secured to the suction member and with the second object secured to and suspended from the first object;
transporting the first object, which is secured to the vacuum device, and the second object, which is suspended from the first object, away from the first location toward the machine after lifting the suction member;
placing the first object and the second object in the machine after transporting the first object and the second object; and
fusing the first object and second object together with the machine to form the article after placing the first object and the second object in the machine.

18. The method of claim 17, further comprising providing an insert between the first object and second object before fusing the first object and the second object together.

19. The method of claim 18, further comprising attaching the insert to both the first object and the second object.

20. The method of claim 18, wherein providing the first object and the second object includes providing the first object, the second object, and the insert in a stack on a support surface at the first location, wherein the second object is disposed between the first object and the insert within the stack.

21. The method of claim 20, wherein applying suction with the suction member includes seizing the first object and the second object simultaneously from the stack with the suction member, wherein transporting the first object and the second object includes transporting the first object and the second object away from the support surface and the insert, further comprising seizing the insert from the support surface using the vacuum device after placing the first object and the second object in the machine, and further comprising transporting the insert toward the machine and between the first and second objects using the suction member after seizing the insert.

22. The method of claim 17, further comprising inflating a substantially sealed area between the first and second objects after fusing the first object and second object together.

23. The method of claim 17, wherein the machine is a thermoforming machine and further comprising molding at least one of the first and second objects with a mold of the thermoforming machine to include a three dimensionally curved surface.

* * * * *